(12) United States Patent
Saito (10) Patent No.: US 7,730,323 B2
(45) Date of Patent: *Jun. 1, 2010

(54) CONTROLLING DATABASE COPYRIGHTS

(76) Inventor: Makoto Saito, 2-12-6-104, Kaitori, Tama-shi, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 11/556,992

(22) Filed: Nov. 6, 2006

(65) Prior Publication Data

US 2007/0110228 A1 May 17, 2007

Related U.S. Application Data (63) Continuation of application No. 11/190,177, filed on Jul. 25, 2005, now Pat. No. 7,383,447, which is a continuation of application No. 09/544,497, filed on Apr. 7, 2000, now Pat. No. 7,036,019, which is a continuation of application No. 08/895,493, filed on Jul. 16, 1997, which is a continuation of application No. 08/416,037, filed on Mar. 31, 1995, now abandoned.

(30) Foreign Application Priority Data

Apr. 1, 1994 (JP) .................................. 6-64889

(51) Int. Cl.
  *H04L 9/32* (2006.01)
  *H04N 7/167* (2006.01)
(52) U.S. Cl. ................. 713/189; 713/193; 380/201
(58) Field of Classification Search ............ 380/201, 380/203, 277; 713/189, 193; 726/26–31, 726/34; 705/51, 57–59
See application file for complete search history.

(56) References Cited

U.S. PATENT DOCUMENTS

| | | | |
|---|---|---|---|
| 4,104,721 | A | 8/1978 | Markstein et al. |
| 4,168,396 | A | 9/1979 | Best |
| 4,225,884 | A | 9/1980 | Block et al. |
| 4,278,337 | A | 7/1981 | Mashimo |
| 4,278,837 | A | 7/1981 | Best |
| 4,352,952 | A | 10/1982 | Boone et al. |
| 4,386,233 | A | 5/1983 | Smid et al. |
| 4,423,287 | A | 12/1983 | Zeidler |
| 4,465,901 | A | 8/1984 | Best |
| 4,527,195 | A | 7/1985 | Cheung |
| 4,558,176 | A | 12/1985 | Arnold et al. |
| 4,567,512 | A | 1/1986 | Abraham |
| 4,588,991 | A | 5/1986 | Atalla |
| 4,613,901 | A | 9/1986 | Gilhousen et al. |
| 4,623,918 | A | 11/1986 | Chomet |

(Continued)

FOREIGN PATENT DOCUMENTS

DE 3717261 11/1987

(Continued)

OTHER PUBLICATIONS

Memon, Nasir, et al., "Protecting Digital Media Content" Association for Computing Machinery, Communications of the ACM, New York, Jul. 1998, vol. 41, issue 7, pp. 35-43.

Murphy, Kathleen, "Digimarc Awarded Patent for Digital Watermarking" Business, Mar. 10, 1998, www.internetnews.com/bus-news/article.php/19611, 2 pgs.

(Continued)

*Primary Examiner*—Hosuk Song (57) ABSTRACT

Briefly, in accordance with one or more embodiments, copyrights of digital data may be controlled.

41 Claims, 4 Drawing Sheets

U.S. PATENT DOCUMENTS

| | | |
|---|---|---|
| 4,709,266 A | 11/1987 | Hanas et al. |
| 4,710,955 A | 12/1987 | Kauffman |
| 4,736,422 A | 4/1988 | Mason |
| 4,751,732 A | 6/1988 | Kamitake |
| 4,757,534 A | 7/1988 | Matyas et al. |
| 4,759,062 A | 7/1988 | Traub et al. |
| 4,791,565 A | 12/1988 | Dunham |
| 4,796,220 A | 1/1989 | Wolfe |
| 4,799,156 A | 1/1989 | Shavit et al. |
| 4,817,140 A | 3/1989 | Chandra et al. |
| 4,827,508 A | 5/1989 | Shear |
| 4,829,569 A | 5/1989 | Seth-Smith et al. |
| 4,850,017 A | 7/1989 | Matyas et al. |
| 4,852,154 A | 7/1989 | Lewis et al. |
| 4,862,268 A | 8/1989 | Campbell et al. |
| 4,864,494 A * | 9/1989 | Kobus, Jr. ............... 726/33 |
| 4,864,614 A | 9/1989 | Crowther |
| 4,864,615 A | 9/1989 | Bennett et al. |
| 4,890,319 A | 12/1989 | Seth-Smith et al. |
| 4,890,321 A | 12/1989 | Seth-Smith et al. |
| 4,905,277 A | 2/1990 | Nakamura |
| RE33,189 E | 3/1990 | Lee et al. |
| 4,916,737 A | 4/1990 | Chomet et al. |
| 4,919,545 A | 4/1990 | Yu |
| 4,933,969 A * | 6/1990 | Marshall et al. ............. 713/177 |
| 4,977,594 A | 12/1990 | Shear |
| 4,995,080 A | 2/1991 | Bestler et al. |
| 5,008,853 A | 4/1991 | Bly et al. |
| 5,029,207 A | 7/1991 | Gammie |
| 5,034,980 A * | 7/1991 | Kubota ................ 713/189 |
| 5,036,461 A | 7/1991 | Elliott et al. |
| 5,046,093 A | 9/1991 | Wachob |
| 5,060,262 A | 10/1991 | Bevins, Jr. et al. |
| 5,077,665 A | 12/1991 | Silverman et al. |
| 5,083,309 A | 1/1992 | Beysson |
| 5,091,938 A | 2/1992 | Thompson et al. |
| 5,103,476 A | 4/1992 | Waite et al. |
| 5,113,518 A | 5/1992 | Durst, Jr. et al. |
| 5,126,566 A | 6/1992 | Shimada |
| 5,138,659 A | 8/1992 | Kelkar et al. |
| 5,142,579 A | 8/1992 | Anderson |
| 5,144,663 A | 9/1992 | Kudelski et al. |
| 5,146,497 A | 9/1992 | Bright |
| 5,157,726 A | 10/1992 | Merkle et al. |
| 5,163,096 A | 11/1992 | Clark et al. |
| 5,173,939 A | 12/1992 | Abadi et al. |
| 5,191,611 A | 3/1993 | Lang |
| 5,204,961 A | 4/1993 | Barlow |
| 5,220,604 A | 6/1993 | Gasser et al. |
| 5,224,163 A | 6/1993 | Gasser et al. |
| 5,227,893 A | 7/1993 | Ett |
| 5,235,641 A | 8/1993 | Nozawa et al. |
| 5,247,575 A | 9/1993 | Sprague et al. |
| 5,270,773 A | 12/1993 | Sklut et al. |
| 5,291,598 A | 3/1994 | Grundy |
| 5,301,245 A | 4/1994 | Endoh |
| 5,313,521 A | 5/1994 | Torii et al. |
| 5,315,657 A | 5/1994 | Abadi et al. |
| 5,319,705 A * | 6/1994 | Halter et al. ................ 705/54 |
| 5,323,464 A | 6/1994 | Elander et al. |
| 5,341,425 A | 8/1994 | Wasilewski et al. |
| 5,343,527 A | 8/1994 | Moore |
| 5,345,508 A | 9/1994 | Lynn et al. |
| 5,347,581 A | 9/1994 | Naccache et al. |
| 5,349,662 A | 9/1994 | Johnson et al. |
| 5,353,351 A | 10/1994 | Bartoli et al. |
| 5,361,091 A | 11/1994 | Hoarty et al. |
| 5,369,702 A | 11/1994 | Shanton |
| 5,375,240 A | 12/1994 | Grundy |
| 5,381,480 A | 1/1995 | Butter et al. |
| 5,390,297 A | 2/1995 | Barber et al. |
| 5,392,351 A * | 2/1995 | Hasebe et al. ................ 705/51 |
| 5,400,403 A | 3/1995 | Fahn et al. |
| 5,410,602 A | 4/1995 | Finkelstein et al. |
| 5,414,772 A | 5/1995 | Naccache et al. |
| 5,428,606 A | 6/1995 | Moskowitz |
| 5,428,685 A | 6/1995 | Kadooka |
| 5,438,508 A | 8/1995 | Wyman |
| 5,442,541 A | 8/1995 | Hube et al. |
| 5,442,706 A | 8/1995 | Kung |
| 5,444,779 A | 8/1995 | Daniele et al. |
| 5,444,782 A | 8/1995 | Adams, Jr. et al. |
| 5,450,493 A | 9/1995 | Maher |
| 5,453,601 A | 9/1995 | Rosen |
| 5,455,863 A | 10/1995 | Brown et al. |
| 5,455,941 A | 10/1995 | Okuno et al. |
| 5,457,746 A | 10/1995 | Dolphin |
| 5,465,299 A | 11/1995 | Matsumoto et al. |
| 5,475,757 A | 12/1995 | Kelly |
| 5,475,758 A | 12/1995 | Kikuchi |
| 5,479,514 A | 12/1995 | Klonowski |
| 5,485,577 A | 1/1996 | Eyer et al. |
| 5,490,216 A | 2/1996 | Richardson |
| 5,495,533 A | 2/1996 | Linehan et al. |
| 5,497,420 A | 3/1996 | Garneau et al. |
| 5,497,479 A | 3/1996 | Hornbuckle |
| 5,499,298 A | 3/1996 | Narasimhalu et al. |
| 5,499,340 A | 3/1996 | Barritz |
| 5,504,816 A | 4/1996 | Hamilton et al. |
| 5,504,817 A | 4/1996 | Shamir |
| 5,504,818 A | 4/1996 | Okano |
| 5,504,933 A | 4/1996 | Saito |
| 5,509,073 A | 4/1996 | Monnin |
| 5,509,074 A | 4/1996 | Choudhury et al. |
| 5,511,121 A | 4/1996 | Yacobi |
| 5,515,441 A | 5/1996 | Faucher |
| 5,515,538 A | 5/1996 | Kleiman |
| 5,517,014 A | 5/1996 | Iijima |
| 5,530,752 A | 6/1996 | Rubin |
| 5,532,920 A | 7/1996 | Hartrick et al. |
| 5,541,994 A | 7/1996 | Tomko et al. |
| 5,553,143 A | 9/1996 | Ross et al. |
| 5,553,145 A | 9/1996 | Micali |
| 5,553,281 A | 9/1996 | Brown et al. |
| 5,577,121 A | 11/1996 | Davis et al. |
| 5,579,223 A | 11/1996 | Raman |
| 5,581,682 A | 12/1996 | Anderson et al. |
| 5,584,023 A | 12/1996 | Hsu |
| 5,604,800 A | 2/1997 | Johnson et al. |
| 5,606,609 A | 2/1997 | Houser et al. |
| 5,606,613 A | 2/1997 | Lee |
| 5,633,934 A | 5/1997 | Hember |
| 5,636,277 A | 6/1997 | Nagahama |
| 5,642,418 A | 6/1997 | Farris et al. |
| 5,646,992 A | 7/1997 | Subler et al. |
| 5,646,997 A | 7/1997 | Barton |
| 5,646,999 A | 7/1997 | Saito |
| 5,649,099 A | 7/1997 | Theimer et al. |
| 5,651,064 A | 7/1997 | Newell |
| 5,666,411 A | 9/1997 | McCarty |
| 5,680,452 A | 10/1997 | Shanton |
| 5,689,587 A | 11/1997 | Bender |
| 5,706,210 A | 1/1998 | Kumano et al. |
| 5,715,393 A | 2/1998 | Naugle |
| 5,740,246 A | 4/1998 | Saito |
| 5,745,572 A | 4/1998 | Press |
| 5,765,152 A | 6/1998 | Erickson et al. |
| 5,765,176 A | 6/1998 | Bloomberg |
| 5,771,383 A | 6/1998 | Magee et al. |
| 5,794,115 A | 8/1998 | Saito |
| 5,812,762 A | 9/1998 | Kim |
| 5,818,933 A | 10/1998 | Kambe et al. |
| 5,825,892 A | 10/1998 | Braudaway |
| 5,832,083 A | 11/1998 | Iwayama et al. |

| | | |
|---|---|---|
| 5,835,601 A | 11/1998 | Shimbo et al. |
| 5,835,765 A | 11/1998 | Matsumoto |
| 5,841,886 A | 11/1998 | Rhoads |
| 5,848,155 A | 12/1998 | Cox |
| 5,848,158 A | 12/1998 | Saito |
| 5,864,683 A | 1/1999 | Boebert et al. |
| 5,867,579 A | 2/1999 | Saito |
| 5,889,868 A | 3/1999 | Moskowitz |
| 5,901,339 A | 5/1999 | Saito |
| 5,910,987 A | 6/1999 | Ginter et al. |
| 5,912,969 A | 6/1999 | Sasamoto et al. |
| 5,933,497 A | 8/1999 | Beetcher et al. |
| 5,968,175 A | 10/1999 | Morishita et al. |
| 5,974,141 A | 10/1999 | Saito |
| 5,982,891 A | 11/1999 | Ginter et al. |
| 5,986,690 A | 11/1999 | Hendricks |
| 6,002,772 A | 12/1999 | Saito |
| 6,006,328 A | 12/1999 | Drake |
| 6,026,430 A | 2/2000 | Butman et al. |
| 6,044,367 A | 3/2000 | Wolff |
| 6,069,952 A | 5/2000 | Saito |
| 6,076,077 A | 6/2000 | Saito |
| 6,081,794 A | 6/2000 | Saito |
| 6,091,835 A | 7/2000 | Smithies et al. |
| 6,097,816 A | 8/2000 | Saito |
| 6,097,818 A | 8/2000 | Saito |
| 6,128,605 A | 10/2000 | Saito et al. |
| 6,160,891 A | 12/2000 | Al-Salqan |
| 6,182,218 B1 | 1/2001 | Saito |
| 6,209,092 B1 | 3/2001 | Linnartz |
| 6,226,618 B1 | 5/2001 | Downs et al. |
| 6,272,635 B1 | 8/2001 | Saito |
| 6,408,390 B1 | 6/2002 | Saito |
| 6,415,271 B1 | 7/2002 | Turk et al. |
| 6,424,715 B1 | 7/2002 | Saito |
| 6,438,694 B2 | 8/2002 | Saito |
| 6,449,717 B1 | 9/2002 | Saito |
| 6,463,536 B2 | 10/2002 | Saito |
| 6,519,623 B1 | 2/2003 | Mancisidor |
| 6,560,339 B1 | 5/2003 | Iwamura |
| 6,574,609 B1 | 6/2003 | Downs et al. |
| 6,603,864 B1 | 8/2003 | Matsunoshita |
| 6,615,258 B1 | 9/2003 | Barry et al. |
| 6,668,324 B1 | 12/2003 | Mangold et al. |
| 6,721,887 B2 | 4/2004 | Saito |
| 6,741,991 B2 | 5/2004 | Saito |
| 6,744,894 B1 | 6/2004 | Saito |
| 6,789,197 B1 | 9/2004 | Saito |
| 6,851,053 B1 | 2/2005 | Liles et al. |
| 6,874,089 B2 | 3/2005 | Dick et al. |
| 7,024,681 B1 | 4/2006 | Fransman et al. |
| 7,036,019 B1 | 4/2006 | Saito |
| 7,093,295 B1 | 8/2006 | Saito |
| 2002/0021807 A1 | 2/2002 | Saito |
| 2002/0052850 A1 | 5/2002 | Saito |
| 2002/0112173 A1 | 8/2002 | Saito |
| 2003/0144963 A1 | 7/2003 | Saito |
| 2005/0262023 A1 | 11/2005 | Saito |

FOREIGN PATENT DOCUMENTS

| | | |
|---|---|---|
| EP | 0121853 | 10/1984 |
| EP | 158167 | 10/1985 |
| EP | 0199410 | 10/1986 |
| EP | 0341801 | 11/1989 |
| EP | 0391261 A3 | 3/1990 |
| EP | 0459046 | 12/1991 |
| EP | 0542298 A3 | 11/1992 |
| EP | 0 518 365 A2 | 12/1992 |
| EP | 0191162 B1 | 2/1993 |
| EP | 0532381 | 3/1993 |
| EP | 0551016 | 7/1993 |
| EP | 0590763 | 4/1994 |
| EP | 0421808 B1 | 12/1994 |
| EP | 0649074 | 4/1995 |
| EP | 0665486 | 8/1995 |
| EP | 0430734 B1 | 9/1995 |
| EP | 0354774 B1 | 4/1996 |
| EP | 0715243 | 6/1996 |
| EP | 0450841 B1 | 8/1996 |
| EP | 0506435 B1 | 10/1996 |
| EP | 0489385 B1 | 3/1997 |
| EP | 0438154 B1 | 7/1997 |
| EP | 0398645 B1 | 8/1997 |
| EP | 0813133 A2 | 12/1997 |
| EP | 0677949 B1 | 5/2003 |
| EP | 0719045 B1 | 10/2003 |
| EP | 0704785 B1 | 11/2003 |
| EP | 0715241 B1 | 1/2004 |
| EP | 0746126 B1 | 12/2004 |
| EP | 0581227 B1 | 9/2005 |
| EP | 0709760 B1 | 5/2006 |
| GB | 2231244 | 11/1990 |
| JP | 59169000 | 9/1984 |
| JP | 60102038 | 6/1985 |
| JP | 62-169540 | 7/1987 |
| JP | 64-041387 | 2/1989 |
| JP | 01048165 | 2/1989 |
| JP | 64-061782 | 8/1989 |
| JP | 3128541 | 5/1991 |
| JP | 3265241 | 11/1991 |
| JP | 03-282989 | 12/1991 |
| JP | 4181282 | 6/1992 |
| JP | 4268844 | 9/1992 |
| JP | 5056037 | 3/1993 |
| JP | 5063142 | 3/1993 |
| JP | 5075597 | 3/1993 |
| JP | 05-122701 | 5/1993 |
| JP | 5276476 | 10/1993 |
| JP | 05-298373 | 11/1993 |
| JP | 5316102 | 11/1993 |
| JP | 5324936 | 12/1993 |
| JP | 5327693 | 12/1993 |
| JP | 5334324 | 12/1993 |
| JP | 6095591 | 4/1994 |
| JP | 6131806 | 5/1994 |
| JP | 6231536 | 8/1994 |
| JP | 6236147 | 8/1994 |
| JP | 6242304 | 9/1994 |
| JP | 6264199 | 9/1994 |
| JP | 6264201 | 9/1994 |
| JP | 6269959 | 9/1994 |
| JP | 6290087 | 10/1994 |
| JP | 6318036 | 11/1994 |
| JP | 7014045 | 1/1995 |
| JP | 7271865 | 10/1995 |
| JP | 8185448 | 7/1996 |
| WO | WO8503830 | 8/1985 |
| WO | WO8909528 | 10/1989 |
| WO | WO 9002382 | 3/1990 |
| WO | WO9307715 | 4/1993 |
| WO | WO 9520291 | 7/1995 |
| WO | WO9613113 | 5/1996 |
| WO | WO9623257 | 8/1996 |
| WO | WO9627259 | 9/1996 |
| WO | WO9750036 | 12/1997 |

OTHER PUBLICATIONS

Hedberg, S.R. "HP's International Cryptography Framework: Compromise or Threat?" IEEE Computer, Jan. 1997, pp. 28-30.
U.S. Appl. No. 11/469,035, filed Aug. 31, 2006, Saito.
U.S. Appl. No. 11/512,885, filed Aug. 29, 2006, Saito.
U.S. Appl. No. 11/512,695, filed Aug. 29, 2006, Saito.
U.S. Appl. No. 11/496,777, filed Jul. 31, 2006, Saito.
U.S. Appl. No. 11/491,400, filed Jul. 20, 2006, Saito.

U.S. Appl. No. 11/480,690, filed Jul. 3, 2006, Saito.
U.S. Appl. No. 11/446,604, filed Jun. 1, 2006, Saito.
U.S. Appl. No. 11/441,973, filed May 25, 2006, Saito.
U.S. Appl. No. 11/404,124, filed Apr. 12, 2006, Saito.
Zhang, N.X. "Secure Code Distribution" IEEE Computer, Jun. 1997, pp. 76-79.
Anonymous, "Security" Government Executive, National Journal, Inc. Washington, vol. 29, issue 1, Jan. 1997, pp. 35-37.
Wayner, P. "Digital Copyright Protection" AP Professional, 1997, pp. 1-7 and 14-17.
U.S. Appl. No. 11/190,177, filed Jul. 25, 2005, Saito.
U.S. Appl. No. 10/352,078, filed Jan. 28, 2003, Saito.
Menezes, Alfred, et al., "Handbook of Applied Cryptography" 1997, sec. 11.5.1, CRC Press, pp. 452-454.
Fitch, K. "User Authentication and Software Distribution on the Web", ausweb97@scu.edu.au Nov. 5, 1996, pp. 1-12.
Rubin, A.D., "Trusted Distribution of Software Over the Internet" Network and Distributed System Security, Feb. 16-17, 1995, San Diego, California, pp. 47-53.
U.S. Appl. No. 10/170,677, filed Jun. 13, 2002, Saito.
U.S. Appl. No. 10/013,507, filed Dec. 13, 2001, Saito.
U.S. Appl. No. 09/985,279, filed Nov. 2, 2001, Saito.
Bryan, John "A look at five different firewall products and services you can install today" www.byte.com/art/9504/sec10/art6.htm, Apr. 1995.
Rubin, A.D., "Secure Distribution of Electronic Documents in an Hostile Environment" Computer Communications, vol. 18, No. 6, Jun. 1995, pp. 429-434.
Bellovin, S.M. et al., "Network Firewalls" IEEE Communications Magazine, vol. 32, No. 9, Oct. 1994, pp. 50-57.
U.S. Appl. No. 09/665,902, filed Sep. 20, 2000, Saito.
Rozenblit, M. "Secure Software Distribution" IEEE Network Operations and Management Symposium, vol. 2, Feb. 14-18, 1994, pp. 486-496.
Van Schyndel, R.G., et al., "A Digital Watermark" IEEE, Australia, 1994, pp. 86-90.
Medvinsky, Gennady et al., "NetCash: A design for practical electronic currency on the Internet" University of Southern California Information Science Institute, Nov. 1993, pp. 2-7.
U.S. Appl. No. 09/476,334, filed Jan. 30, 2000, Saito.
U.S. Appl. No. 09/362,955, filed Jul. 30, 1999, Saito.
Lennil, P. "The IBM Microkernel Technology," OS/2 Developer, vol. 5, Nov. 1, 1993 (pp. 70-72, 74) XP000672962.
Seki, Kazunori et al., "A Proposal of a New Distribution Scheme for Software Products", Keio Department of Instrumentation Engineering, Faculty of Science and Technology, Keio University, Research report made at the information Processing Association, Japan, Jul. 20, 1993, vol. 93, No. 64, pp. 19-28.
Vigarie, J. "A Device for Real-Time Modification of . . . " 18$^{th}$ International Television Symposium and Technical Exhibition, Montreaux, Switzerland, Jun. 10-15, 1993, pp. 761-768.
Neuman, Clifford B., Proxy-Based Authorization and Accounting for Distributed Systems, Proceedings of the 13$^{th}$ International Conference on Distributed Computing Systems, May 1993, pp. 283-291.
Ham, Lein, et al., "Software Authentication System for Information Integrity" Computers & Security International Journal Devoted to the Study of Technical and Financial Aspects of Computer Security, vol. II, Dec. 1, 1992, pp. 747-752, XP000332279.
Anonymous, "Encryption of Information to be Recorded so as to Prevent Unauthorized Playback" Research Disclosure No. 335, Mar. 1992, Emsworth, GB, p. 219.
Masuoka, Fujio, Progressing Flash Memories Kogyo Chosa-kai Co., Chapter 1: Semiconductor Memory, pp. 34-68.
Tatsuaki Okamoto, "Universal Electronic Cash", Technical Report of Institute of Electronics, Information and Communication Engineers (IEICE) Jul. 15, 1991, vol. 91, No. 127, pp. 39-47.
Komatsu, Naohisa, et al., "A Proposal on Digital Watermark in Document Image Communication and its Application to Realizing a Signature" Electronics & Communications in Japan Part I—Communications, vol. 73, No. 5, part I, May 1, 1990, pp. 22-33.
U.S. Appl. No. 08/895,493, filed Jul. 16, 1997, Saito.
U.S. Appl. No. 08/846,661, filed May 1, 1997, Saito.
Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.
Morizaki, H., "Introduction to Electronic Devices" Gijustsu Hyoron Publishing Co., 1989, pp. 260-266.
Gale, Brent et al., "Satellite and Cable TV Scrambling and Descrambling" Baylin/Gale Productions, 2nd Edition, 1986, pp. 163-165.
U.S. Appl. No. 08/733,504, filed Oct. 18, 1996, Saito.
Grampp, F.T. et al., "Unix Operating System Security" AT&T Bell Laboratories Technical Journal, vol. 63, No. 8, Oct. 1984, New York, pp. 1649-1672.
Adachi, R., "Introduction to handcraft of Personal Computer" Natsume Publishing Co., 1983, pp. 141-155.
"Des Modes of Operation" U.S. FIPS Publication 81, Dec. 2, 1980, 23 pgs.
"Internet Privacy Enhanced Mail", Association for Computing Machinery, Communications of the ACM, Aug. 1993, vol. 36, issue 9, pp. 48-61.
U.S. Appl. No. 11/701,943, filed Feb. 1, 2007.
U.S. Appl. No. 11/701,945, filed Feb. 1, 2007.
U.S. Appl. No. 11/701,946, filed Feb. 1, 2007.
Search Report dated Oct. 24, 2002.
Response to Notice of Non-Compliant Amendment; U.S. Appl. No. 10/352,078, filed May 13, 2008.
Restriction Requirement; U.S. Appl. No. 10/352,078; Mailed Mar. 21, 2008.
Non-Final Office Action; U.S. Appl. No. 10/105,262; Mailed Jan. 31, 2008.
Response to Office Action; U.S. Appl. No. 10/105,262, filed Apr. 30, 2008.
Non-Final Office Action; U.S. Appl. No. 09/985,279; Mailed Mar. 26, 2008.
Response to Restriction Mailed Mar. 21, 2008; U.S. Appl. No. 10/352,078, filed Apr. 21, 2008.
Response to Office Action Mailed Aug. 23, 2007; U.S. Appl. No. 11/469,035, filed Feb. 22, 2008.
Non-Final Office Action; U.S. Appl. No. 11/469,035; Mailed Jun. 11, 2008.
Official Action in Japanese Patent Application No. 2007-260256 dated Sep. 7, 2009, 8 pages; English Translation Available.

* cited by examiner

FIG. 1A

NEED STORAGE PERMIT KEY.

FIG. 1B

STORAGE UNAVAILABLE.
EDIT UNAVAILABLE.
TRANSFER UNAVAILABLE.

FIG. 2A

PICTURE SIGNAL
HORIZONTAL RETRACE INTERVAL
VERTICAL RETRACE INTERVAL

FIG. 2B

PICTURE DATA
HORIZONTAL SYNCHRO. SIGNAL
VERTICAL SYNCHRO. SIGNAL

CONTROLLING DATABASE COPYRIGHTS

CROSS-REFERENCE TO RELATED APPLICATION(S)

The present application is a continuation of U.S. application Ser. No. 11/190,177 filed Jul. 25, 2005 now U.S. Pat. No. 7,383,447, which in turn is a continuation of U.S. application Ser. No. 09/544,497 filed Apr. 7, 2000 now U.S. Pat. No. 7,036,019 which is in turn is a continuation of U.S. application Ser. No. 08/895,493 filed Jul. 16, 1997, which is in turn is a continuation of U.S. application Ser. No. 08/416,037 filed Mar. 31, 1995 now abandoned. The entire disclosure of prior application Ser. No. 11/190,177 is considered as being part of the disclosure of the present application and is hereby incorporated by reference herein in its entirety.

BACKGROUND

1. Field of the Invention

The present invention relates to controlling copyrights on utilizing, storing, copying, editing and/or transferring of digital data.

2. Description of the Related Art

In the information oriented society of today, database systems are becoming wide spread in which it is possible to use various types of data, stored independently by each computer in the past, by connecting computers via communication lines.

In such a database system, the information handled up to this point has been conventionally coded information that can be processed by computer, and that contains a relatively small amount of information and monochrome binary data, such as facsimile information at the most. It is not possible to handle data containing a relatively large amount of information, such as data for natural pictures or animation.

With the rapid progress of digital processing techniques for various types of electrical signals, a technique is under development for digital processing of picture signals other than binary data, handled only as analog signals in the past.

By digitizing the picture signal, it is possible to handle a picture signal, such as television signal, by computer. As a technique of the future, attention is now focused on "multimedia systems", which can simultaneously handle the data processed by computers and digitized picture data. Because the picture data contains an overwhelmingly large amount of information compared with character data and audio data, it is difficult to store, transfer or process the picture data by computer. For this reason, techniques for compressing and expanding picture data have been developed. Further, several standards for compression/expansion of picture data have been established. For example, the following standards have been established as common standards: JPEG (Joint Photographic image coding Experts Group) standards for still pictures, H.261 standards for television conferences, MPEG1 (Moving Picture image coding Experts Group 1) standards for picture accumulation, and MPEG2 standards to cope with current television broadcasting and high definition television broadcasting. By implementing these new techniques, it is now possible to transmit digital picture data in real time.

For analog data, which has been widely used in the past, the control of copyrights during processing has not been an important issue because the quality of the analog data deteriorates each time the data is stored, copied, edited or transferred. However, the quality of digital data does not deteriorate even when the data is repeatedly stored, copied, edited or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound and picture recording devices has been prescribed.

It is possible not only to refer to the content of a database, but also to effectively utilize the data obtained from the database by storing, copying or editing the data, and also transferring the edited data to other persons or to the database with the edited data registered as new data.

In a conventional database system, only character data is handled. However, in multimedia systems, sound data and picture data, which are originally analog data, are digitized and used as part of the database in addition to the other data in the database, such as character data.

Under such circumstances, it is an important question as to how to handle copyrights of the data in the database. However, there are no means in the prior art for copyright management and control of such actions as copying, editing, transferring, etc., of data.

A system for executing copyright control by using encrypted data and obtaining a permit key from a key control center via public telephone lines is disclosed in Japanese Patent Application 4-199942 (U.S. Ser. No. 08/098,415) and Japanese Patent Application 4-289074 (U.S. Ser. No. 08/143,912) of the present inventors. A device for this purpose is disclosed in Japanese Patent Application 4-276941 (U.S. Ser. No. 08/135,634), also of the present inventors.

SUMMARY OF THE INVENTION

It is an object of the present invention to provide a method for controlling copyrights in the display (including the process of providing sound), storage, copying, editing and transfer of digital data in a database system including real time transmission of digital pictures.

For the control of copyrights in the database system to which the present invention is applied, it is essential to transmit one or more of copyright information; i.e., messages of copyright control, information about copyrights and a program for controlling copyrights, when necessary, in addition to a key for enabling users who wish to use encrypted data.

The copyright control message is displayed on a screen and advises or warns the user if the data is being utilized in a manner inconsistent with the conditions of the user's request or permission. The copyright control program watches and controls data use so that the data is not utilized beyond the conditions of the user's request or permission.

The copyright control program, the copyright information and the copyright control message are supplied together with a permit key in some cases, but they may also be supplied together with data in other cases. It is also possible to supply a part of them together with the permit key, and to supply the other part with the data.

For the data, the permit key, the copyright control message, the copyright information and the copyright control program, there are the following three cases: they are transmitted in encrypted form and decrypted upon use; they are transmitted in encrypted form and decrypted only when they are displayed; or they are not encrypted at all.

DETAILED DESCRIPTION

In the following, description will be given on embodiments of the present invention.

Figure 3A:
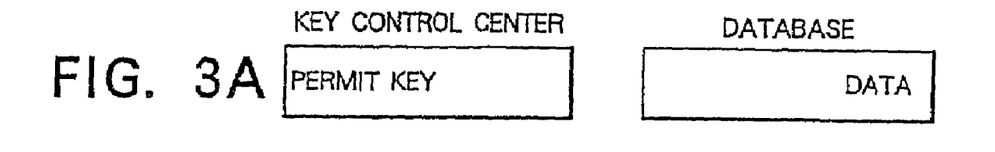
FIG. 3A to FIG. 3J illustrate embodiments of the present invention.

In the prior patent applications mentioned above, it is assumed that a permit key obtaining route is different from a data obtaining route as shown in FIG. 3A, and that the permit key is obtained from a key control center via public telephone lines. However, if a charging method is determined, it is possible to obtain the permit key via the communication system through which the database is supplied.

In the system of the prior patent applications, it is assumed that the permit key for secondary exploitation is used for distribution of the data selected for secondary exploitation. Secondary exploitation involving the storing, copying, editing, transferring, etc. of data is not included in the assumption. Also, it is assumed that the data is distributed only inside a LAN to which the users belong. Distribution outside the LAN is not part of the assumption. Therefore, the system is not adequate to cope with secondary exploitation unless the users choose to honor the copyright.

Figure 4A:
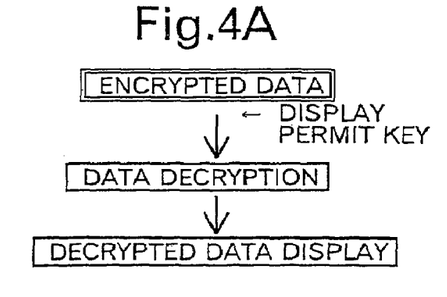
FIGS. 4A-4E illustrate structures of embodiments of the present invention.
Figure 4B:
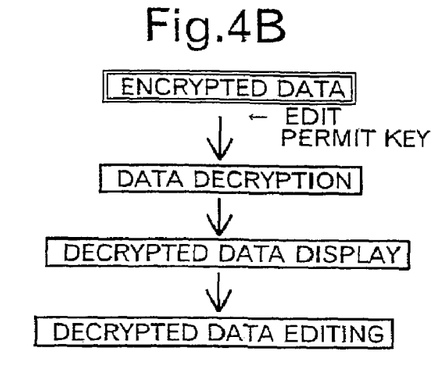
Figure 4C:
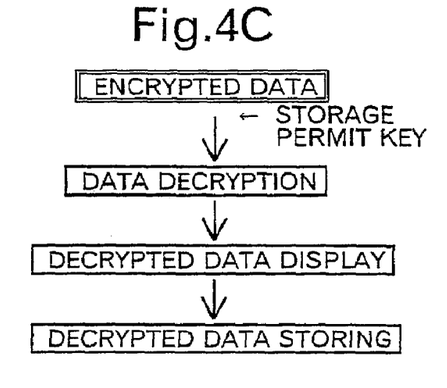
Figure 4D:
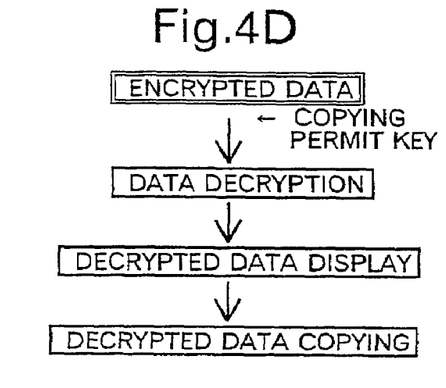
Figure 4E:
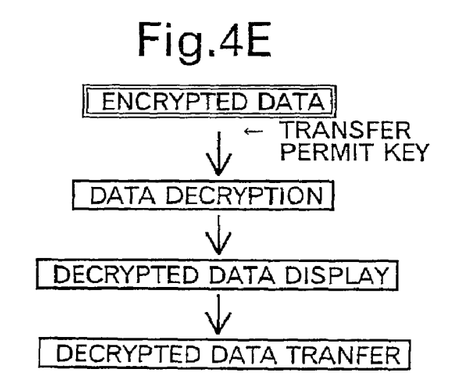

To cope with various forms of the secondary exploitation as described above, a plurality of permit keys are prepared to match each form of use, and no utilization is possible unless there is a permit key suitable for the desired form of use. As to the forms of use available for a database, there are display, storage, copying, edit, transfer, etc. Examples of these utilization forms as shown in FIGS. 4A to 4E. FIG. 4A illustrates a case when supplied encrypted data is displayed. The encrypted data is decrypted by a display permit key, and the data thus decrypted is displayed. FIG. 4B illustrates a case when supplied encrypted data is edited. The encrypted data is decrypted by an edit permit key, and the data thus decrypted is displayed, and then editing is performed. FIG. 4C illustrates a case when supplied encrypted data is stored. The encrypted data is decrypted by a storage permit key, and the data thus decrypted is displayed, and then storing is performed. FIG. 4D illustrates a case when supplied encrypted data is copied. The encrypted data is decrypted by a copy permit key, and the data thus decrypted is displayed, and then copying is performed. FIG. 4E illustrates a case when supplied encrypted data is transferred. The encrypted data is decrypted by a transfer permit key, and the data thus decrypted is displayed, and then transfer is performed. In these Figures, double-framed parts show that data is encrypted. The permit keys suitable for these forms of use should be prepared. However, in the case where the ability to execute several forms of use at the same time is desired, it is necessary to obtain a plurality of permit keys. If the user fails to obtain the permit keys, the desired form of use may not be executed.

To avail such situations, a permit key can be used which makes it possible to execute several forms of use. Hierarchical permit keys can be used such that an upper level key also fulfills the function of a lower level key. For example, from lower level to upper level the hierarchy is defined as: display<storage<copying<edit<transfer. With the display permit key, only display operations can be executed. Display and storage operations can be executed by the storage permit key. Display, storage and copying operations can be executed by the copying permit key. Display, storage, copying and edit operations can be executed by the edit permit key. Display, storage, copying, edit and transfer operations can be executed by the transfer permit key.

In the prior patent application, i.e. Japanese Patent Application 4-276941 (U.S. Ser. No. 08/135,634), the present inventors have proposed a system in which a plurality of encrypted data, each encrypted one of a plurality of different crypt keys, are recorded (stored) in encrypted form. The data is decrypted when it is utilized, in the system where the storage permit key is the lowest level key.

By applying this system, it is possible to order key hierarchy from lower-level to upper-level in the order of storage<copying<transfer-<display<edit. Specifically, the order is set in such manner that storage operations can be executed by a storage permit key; storage and copying operations can be executed by a copying permit key; storage, copying and transfer operations can be executed by a transfer permit key; storage, copying, transfer and display operations can be executed by a display permit key; and storage, copying, transfer, display and edit operations can be executed by an edit permit key.

In this system, storage, copying and transfer are placed at a lower level than display because, even when storage, copying and transfer operations are executed on the data, it is difficult and meaningless to utilize the data since it cannot be displayed. It is necessary to execute display in order to utilize the data. This hierarchical arrangement is best suited to a system, in which encrypted data are supplied and are utilized using a permit key.

The permit key is usually offered to the user on payment basis. Therefore, except where data utilization is unlimited, the number of times the permit key may be used is limited to one time or several times if it is necessary to limit the number of times the data is used.

Because the data can be used if there is a permit key, it is possible to use the data beyond the permitted range if the permit key is duplicated or falsified. To prevent this, the permit key is encrypted.

The use of data includes storage, display, copying, edit, transfer, etc. thereof, which are necessary to be allowed or prohibited.

In the case where it is necessary to limit the number of usage times or to limit forms of use, it is desirable to display a message for such purpose.

In the case where the information under copyright is falsified, the data supplier or the user may suffer damages. This must be prevented.

To ensure complete copyright control, information on the original copyright and information on secondary and tertiary copyrights for the edition of the data are given to the data.

The above copyright control is executed by the copyright control program.

In a conventional database system, the data itself is offered in a completely defenseless state. Therefore, copyright control can be executed only when data is taken out of the database. In the subsequent copyright control, there is no other way but to rely on conscience of the user and to take necessary measures when the data is utilized beyond the permitted range of use.

For this reason, as described in the prior patent application, i.e. Japanese Patent Application 4-276941 (U.S. Ser. No. 08/135,634), the data supplied from the database are left in an encrypted state, and storage is executed under this condition. In addition, copying and transfer are also executed in the encrypted state. Decrypting is performed only in display and edit operations, and these are controlled by the copyright control program. These examples are shown in FIGS. 5A to 5E.

Figure 5A:
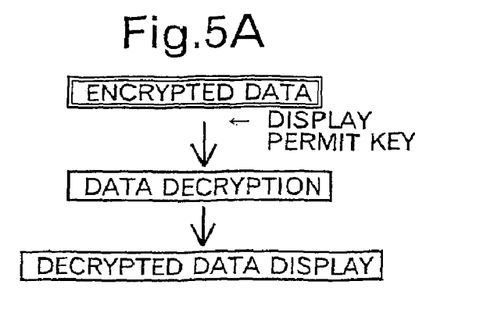
FIGS. 5A-5E illustrate structures of embodiments of the present invention.
Figure 5B:
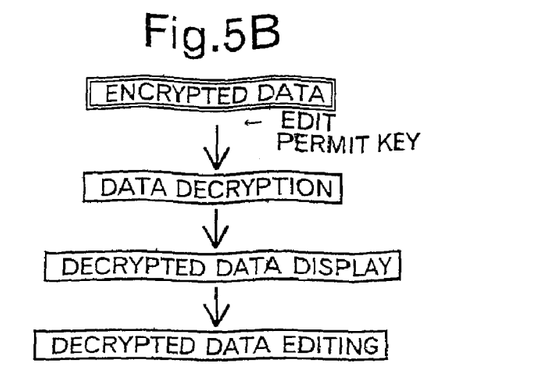
Figure 5C:
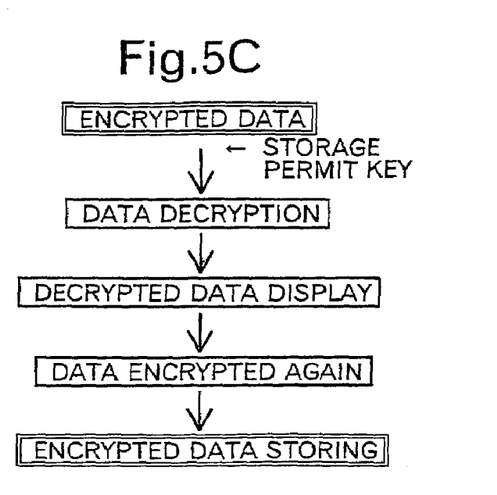
Figure 5D:
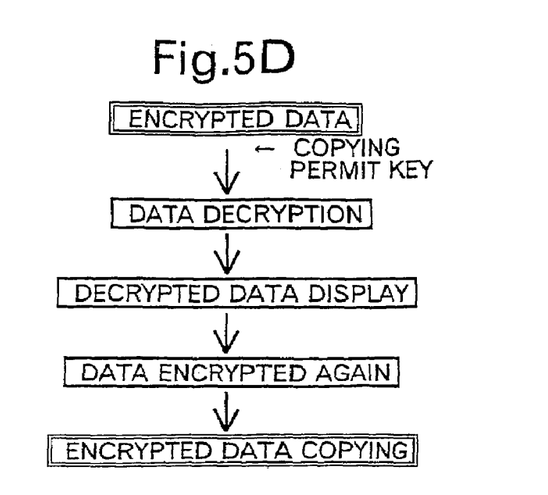
Figure 5E:
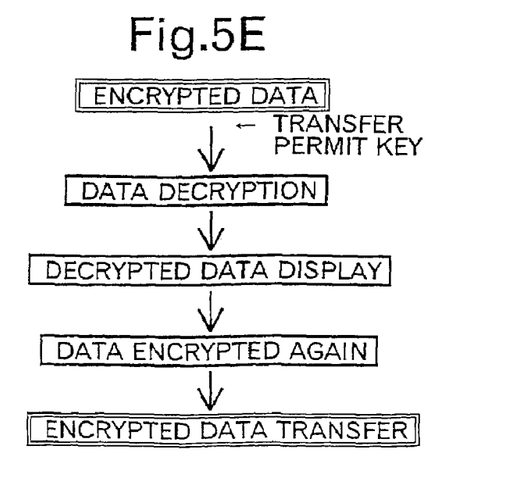

FIG. 5A illustrates a case when supplied encrypted data is displayed. The encrypted data is decrypted by a display permit key, and the data thus decrypted is displayed. FIG. 5B illustrates a case when supplied encrypted data is edited. The encrypted data is decrypted by an edit permit key, and the data thus decrypted is displayed, and then editing is performed. FIG. 5C illustrates a case when supplied encrypted data is stored. The encrypted data is decrypted by a storage permit key, and the data thus decrypted is displayed, and then, the decrypted data is encrypted again by the storing permit key, and then storing is performed. Thus, the data encrypted again is stored. FIG. 5D illustrates a case when supplied encrypted data is copied. The encrypted data is decrypted by a copy permit key, and the data thus decrypted is displayed and then, the decrypted data is encrypted again by the copy permit key, and then copying is performed. Thus, the data encrypted again is copied. FIG. 5E illustrates a case when supplied encrypted data is transferred. The encrypted data is decrypted by a transfer key, and the data thus decrypted is displayed and then, the decrypted data is encrypted again by the transfer permit key, and then transfer is performed. Thus, the data encryption again is transferred. In these Figures, double-framed parts show that data is with encrypted. In so doing, it is impossible to use the data beyond the permitted range. In this case, the copyright control program may be integrated with the data or may be encrypted.

Because the copyright control program is encrypted and the permit key decrypts the copyright control program, and because the copyright control program decrypts and encrypts the data, the data is encrypted twice.

In this case, if a crypt key unique to the data is added to the copyright control program for the purpose of encrypting the data, it is impossible to decrypt the data if the copyright control program is separated from the data.

In this copyright control program, even if the data is stored, copied or transferred within the permitted range of use, and if these operations are executed after the data and the copyright control program have been encrypted, it is impossible to use the data in an undesired manner.

If an operator uses a computer program inadequately and, as a result, the computer does not respond any more or computer operation is stopped, an error message is displayed so that the operator may know the cause. Similarly, if a user of the database erroneously uses the data beyond the permitted range of the permit key, and, as a result, the computer does not respond or operation is stopped, the user cannot understand the cause. In this case, a copyright control message is displayed just as an error message is displayed by the copyright control program.

The display of the copyright control message as described above also fulfills the function of providing a warning if the user intentionally uses the data beyond the range of use permitted by the permit key.

In general, various programs are incorporated into read-only memory (ROM) inside the equipment which the user uses, or the programs are supplied from software. When the programs are incorporated into ROM, there is no possibility that the programs may be changed. However, the equipment to be used is limited to systems that contain the ROM. On the other hand, when the programs are supplied from software, there is no system limitation if the programs are transferred. However, there is a possibility that the programs may be altered.

The database is utilized by various users using various types of devices. Therefore, if the programs for controlling copyrights are supplied as software, it is necessary to cope with various types of devices. Further, alteration of the programs must not be possible. Therefore, the copyright control program should be encrypted to prevent such trouble. In this case, it is necessary to modify the program according to the device that the user uses. A program to translate the copyright control program is provided in the communication software of the device which the user uses. The copyright control program can then be translated by the translation program so that it suits the device.

Even though the permit key for using the database may become more complicated due to encryption, a data size of several tens of bites is sufficient. Therefore, the time required for transmitting the permit key is far shorter than one second. In other words, even when a payment-based public telephone line is used and other information is transmitted together with the permit key, the increase of cost is negligible.

Figure 3B:
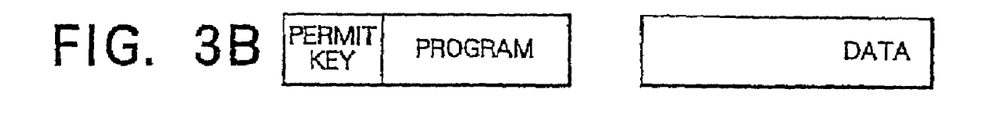

Therefore, when transmitting the permit key as shown in FIG. 3B, utilizing surplus time, the copyright control program can be transmitted.

Figure 3C:
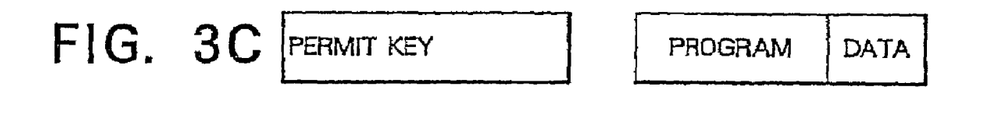

The copyright control program can be supplied together with the permit key and also together with the data as shown in FIG. 3C.

In this case, the copyright control program is supplied together with the data, and the entire data utilization process is placed under control of the copyright control program. For example, the data supplied in encrypted form cannot be decrypted unless the copyright program supplied with it is used. If there is no such copyright control program, the data cannot be used. Thus, the control of copyrights is reinforced. Also, integration of the copyright control program with the data further reinforces copyright control.

The following are some examples of the copyright control message:

"Need a display permit key."
"Need a storage permit key."
"Need a copying permit key."
"Need an edit permit key."
"Need a transfer permit key."

Some other examples are:

"Display unavailable."
"Storage unavailable."
"Copy unavailable."
"Edit unavailable."
"Transfer unavailable."

Figure 1A:
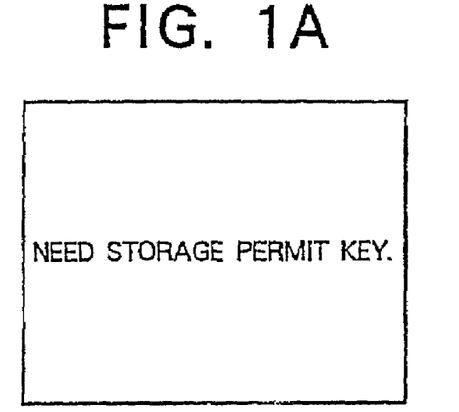
FIG. 1A and FIG. 1B illustrate examples of display messages of the present invention.
Figure 1B:
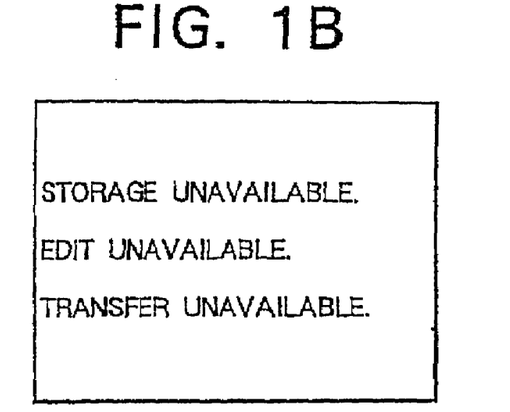

These copyright control messages are displayed alone as shown in FIG. 1A or in combination as shown in FIG. 1B.

Next, description will be given on supply of the copyright control message.

To display the copyright control message, the message must be stored in the memory of the device which the user uses. The memory in the device is classified as ROM and random-access memory (RAM).

The method of storing the messages in ROM is reliable, but there is a limitation to the device because the user must use the ROM wherein the copyright control messages are stored.

As for methods for storing messages in RAM, there is a method for supplying messages together with the permit key, a method for supplying messages together with the copyright control program, and a method for supplying messages together with the data. When the permit key and the copyright control program are supplied at the same time, the copyright control message can also be supplied at the same time.

The copyright control message is not effective unless an adequate message is displayed. For this reason, the copyright control message cannot play its designed role if the message is changed in such a manner that no substantial content is displayed, or further, if its content is deleted such that nothing is displayed. To prevent this trouble, the message is encrypted.

The display of the copyright control message is executed by the copyright control program. The modes of display are as follows. (1) When an operation is attempted with no adequate key available, a corresponding message is displayed. (2) All messages corresponding to operations available for the current permit key are displayed, if an operation is attempted without an available permit key.

Figure 3D:
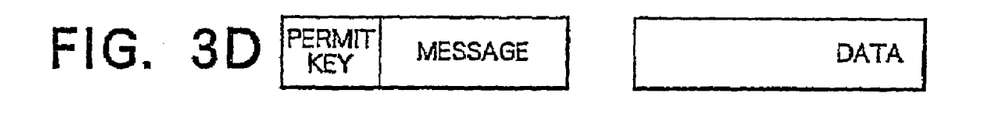
Figure 3E:
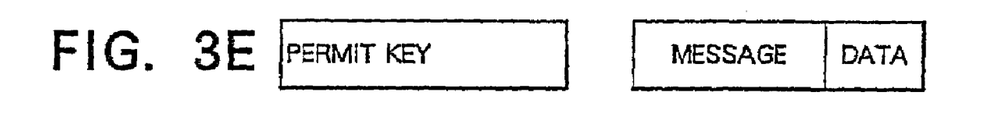

The copyright control message is supplied together with the permit key as shown in FIG. 3D, or together with the data as shown in FIG. 3E.

The copyright control message is transmitted by transmitting all messages or only the necessary messages required. In the former case, the quantity of information is relatively large, but security is high. In the latter case, the quantity of information is relatively small, but security is low.

It is desirable that the copyright control message be inseparable from the data, as in the case of the copyright control program. This may be facilitated by integrating the copyright control message with the copyright control program.

To display the copyright on printed matter, the name of the author and the date are used. The copyright of the database is displayed by entering information such as the name of the author and the date.

As described above, edit and up-load of edited data are included in the use of the data in the database. Specifically, the presence of secondary data, which is edited from the data, i.e. a work of authorship, is recognized. To ensure the copyright of the data in this context, it is necessary to store the information on original authorship and secondary authorship together with the data. In case the data is used in a manner other than for down-loading and display, copyright information including information on the operator, in addition to the copyright information stored up to that moment, is stored together with the data as history.

In this case, only the person who controls the database can put the original authorship into the database as primary data. All data handled by other than the person in charge of database control is considered secondary data. Control of the data history is therefore further reinforced.

When the copyright information is separated from data which is a work of authorship, it becomes extremely difficult to recognize the copyright. Thus, it is necessary that the copyright information be inseparable from the data.

To prevent separation of the copyright information from the data, a method for integrating the data with the copyright information or a method for making the data unusable without copyright information are described. These methods are similar to the methods described above for the copyright control program and the copyright control message.

First, description will be given for a method for integrating the data with the copyright information.

The data handled by computer comprises a file header indicating data name and size, and a file body, which comprises the main body of data. Therefore, for integrating the data with the copyright information, there are methods that integrate the copyright information with the file header, that integrate the copyright information with the file body, and that take other means for the purpose.

Among these methods, the method that integrates the copyright information with file header, if the data is character information expressed with the character code, is available even without a file header. Thus, the method is simple, but not very reliable. Also, because the capacity of the file header is not high, it is not sufficient if there is a large amount of copyright information.

Digital picture data and digital sound data are grouped together under a common group header. The copyright information can be integrated into this group header. However, there is a problem of header capacity similar to the case for the file header.

For the method of integrating the copyright information with the file body, one way is to add copyright information for each piece of data edited. Another way is to add the copyright information all together.

To add the copyright information for each piece of data edited, the copyright information is added to each piece of data which is edited by a cut-and-paste procedure and produced. This is not only complicated but disadvantageous in that the entire file data becomes too big.

If the picture data indicates the copyright of original authorship, it is easy to identify corresponding data. Thus, it is not always necessary to add the copyright information to each minimum unit of the edited data.

It is also possible to write the copyright information into the copyright control program. In this method, it is difficult to manipulate the copyright information if it is written into the copyright control program integrated with the data as already described.

If the data is a picture signal, it is necessary to have synchronization signal data in order to define scanning line, field and frame. This synchronization signal has high redundancy and is generally represented with variable-length code. Thus, the copyright information can be mixed with the variable-length code. The number of scanning lines is 480 for VGA standards. By utilizing this method, a considerable quantity of information can be mixed into it.

In case the picture data is an animated picture, it is possible to write a sufficient quantity of copyright information in this method. However, if the picture data is a still picture edited by a cut-and-paste procedure, there may not be enough space to add the copyright information.

Figure 2A:
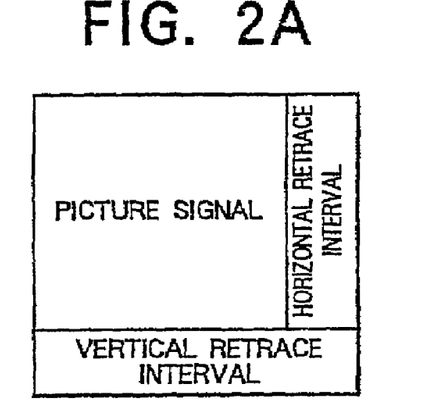
FIG. 2A and FIG. 2B illustrate structures for television signals.
Figure 2B:
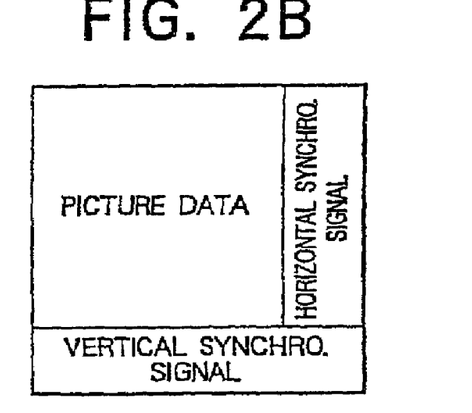

FIG. 2A and FIG. 2B represent structures for an analog television signal and a digital television signal. FIG. 2A represents an analog television signal, and FIG. 2B shows a digital television signal.

A signal containing other than picture data, such as the multiplex teletext signal in analog television, is inserted by utilizing the vertical retrace interval. The horizontal retrace interval is not utilized.

In contrast, in digital television, it is possible for a copyright control program or other multiplex teletext signal to be placed into horizontal scanning data or into vertical scanning data.

As a method for integrating the copyright information with data, one way is to write the copyright information into the data itself, and another is to write it into control code.

With the data used in computer, there is control code for controlling the communication system or computer system in addition to the data to be displayed on screen or used for some operations. This control code cannot be seen by the user. Therefore, if the copyright information is written into the control code, the copyright information thus written does not cause trouble for the user.

It is also possible to enter the copyright information into the files of the computer using the technique of a computer virus without affecting the operation itself.

Figure 3F:
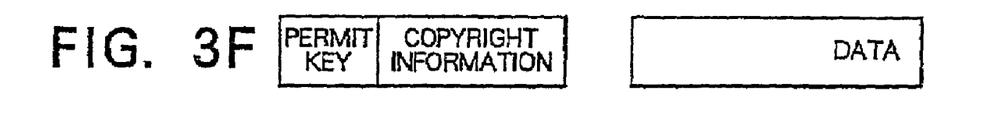
Figure 3G:
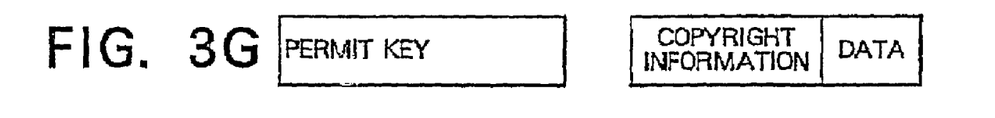

The copyright information may be supplied together with the permit key as shown in FIG. 3F or may be supplied together with data as shown in FIG. 3G.

Attention has been focused in recent years on digital signatures. Using a private key, which only the person concerned knows, and a public key, which other persons also know, a digital signature is prepared from the private key and from the data on the file size of the document data. If the document data is changed, the change can be confirmed by the private key, and the content of the document data can be seen at any time by other persons using the public key. Thus, this scheme offers very high security.

The data in a computer can be changed without leaving any trace. Because of this, an author may not notice that his copyright is infringed, or a user may use the data without knowing that the content of the data has been changed, and the author or user may suffer damages. To prevent this, a digital signature is attached to the data, and damage to the copyright owner or the user can be avoided.

The permit key, copyright control program, copyright control message, and copyright information can be combined in any way as necessary to actualize the method for controlling database copyrights.

Figure 3H:
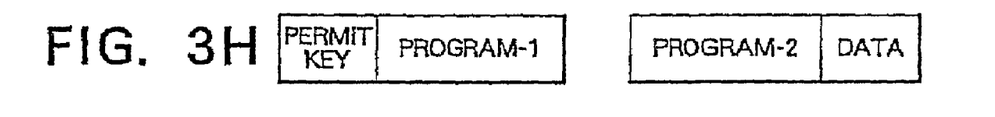
Figure 3I:
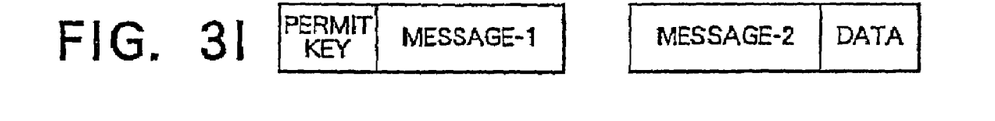
Figure 3J:
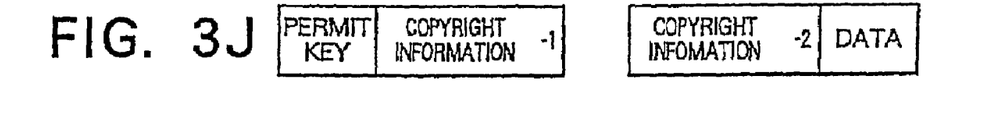

Also, it is possible to design in such a manner that only a part of the data of the copyright control program, the copyright control message or the copyright information is supplied together with the permit key as shown in FIGS. 3H, 3I and 3J, and that the other part is supplied together with the data to be utilized. The part supplied with the permit key and the part supplied together with the data are then combined and the functions of the complete permit key may be served after they have been combined together.

Thus, it is possible to give the function of the permit key to the copyright program and copyright control message, and higher security is ensured.

What is claimed is:

1. A method, comprising:
   a computer system receiving encrypted data; and
   the computer system using a first utilization permit key associated with the received encrypted data to decrypt said received encrypted data, wherein the first utilization permit key is usable to authorize the performing of at least one, but not all, of a plurality of operations on a version of the decrypted data, wherein the plurality of operations include two or more of the following types of operations: displaying, editing, storing, copying, transferring; and
   wherein the first utilization permit key is usable to authorize the performing of at least one of the plurality of operations on a re-encrypted version of the decrypted data.

2. The method of claim 1, wherein said plurality of operations are hierarchical.

3. The method of claim 1, further comprising using a copyright management program to manage utilization of said received encrypted data.

4. The method of claim 3, further comprising receiving said copyright management program.

5. The method of claim 1, wherein said received data includes copyright information.

6. The method of claim 5, wherein said copyright information includes original copyright information and copyright information added to said data by a copyright management program.

7. The method of claim 5, further comprising a copyright management program verifying that the copyright information is present.

8. The method of claim 1, further comprising receiving the first utilization permit key with said encrypted data.

9. A method, comprising:
   a computer system receiving encrypted data and a utilization permit key;
   the computer system using the utilization permit key on said received encrypted data, wherein said utilization permit key includes a first permit key and a second permit key;
   wherein said first permit key is pre-defined to permit the performing of a first function of a plurality of functions on said received data;
   wherein said second permit key is pre-defined to permit the performing of a second function of the plurality of functions on said received data, wherein the first function is different than the second function; and
   wherein said first permit key is pre-defined to permit the performing of the first function on a decrypted version of the received encrypted data, and wherein the second permit key is pre-defined to permit the performing of the second function on a re-encrypted version of the received encrypted data.

10. The method of claim 9, wherein said plurality of functions is hierarchical, and includes two or more of the following types of functions: displaying of data, editing of data, storing of data, copying of data, transferring of data.

11. The method of claim 9, further comprising using a copyright management program for managing utilization of said data.

12. The method of claim 11, further comprising receiving said copyright management program.

13. The method of claim 9, wherein said received data includes copyright information.

14. The method of claim 13, wherein said copyright information includes original copyright information and copyright information added to said received data by a copyright management program.

15. The method of claim 13, wherein said received data cannot be used without the receipt of copyright information associated with the received data.

16. A method comprising:
   a computer system receiving encrypted data;
   the computer system decrypting said received encrypted data;
   the computer system determining whether said decrypted data includes copyright information, and, if not, preventing use of said decrypted data;
   upon determining that the decrypted data includes copyright information, the computer system using a utilization permit key to authorize performing one or more of a plurality of operations on the decrypted data and one or more of the plurality of operations on a re-encrypted version of the decrypted data.

17. The method of claim 16, wherein the plurality of operations is hierarchical.

18. The method of claim 16, further comprising using a copyright management program to manage utilization of said received data.

19. The method of claim 18, further comprising receiving said copyright management program along with said utilization permit key.

20. The method of claim 16, wherein said copyright information includes original copyright information and edit copyright information added to said data by a copyright management program.

21. The method of claim 16, further comprising receiving the utilization permit key with said encrypted data.

22. A method, comprising:
   receiving, at a computing device, encrypted data;

the computing device using a utilization permit key to authorize the performing of one or more, but not all, of a plurality of operations on said received encrypted data and prevent the performing of the remaining plurality of operations on said received encrypted data; and the computing device using a copyright management program to manage utilization of said received encrypted data, wherein said copyright management program is received along with said utilization permit key.

23. The method of claim 22, further comprising decrypting said received encrypted data using the utilization permit key, and wherein said plurality of operations is hierarchical.

24. The method of claim 22, further comprising receiving the utilization permit key with said encrypted data, the method further comprising decrypting the received encrypted data using the utilization permit key.

25. A method, comprising:

a first computer system encrypting data using a utilization permit key, wherein the utilization permit key is usable by a second computer system to decrypt the encrypted data and to authorize the second computer system to perform a first set of one or more of a predetermined set of operations on the decrypted data and to perform a second set of one or more of the predetermined set of operations on a re-encrypted version of the decrypted data, wherein the operations in the first and second sets of operations are not identical, and wherein the first set of operations does not include all of the operations in the predetermined set of operations.

26. The method of claim 25, further comprising the first computer system providing the encrypted data and the utilization permit key to the second computer system.

27. The method of claim 26, wherein the encrypted data includes copyright information, the absence of which prevents use of a decrypted version of the encrypted data received at the second computer system.

28. An article of manufacture including a computer-readable medium having instructions stored thereon that, if executed by a computer system, cause the computer system to perform a method comprising:

receiving encrypted data;

decrypting the received data using a utilization permit key, wherein the utilization permit key is farther configured to permit a first set of operations to be performed on the decrypted data, and to prevent a second set of operations from being performed on the decrypted data, and wherein the utilization permit key is further configured to permit at least one of the second set of operations to be performed on a re-encrypted version of the decrypted data.

29. The article of manufacture of claim 28, wherein the first and second sets of operations are hierarchical.

30. The article of manufacture of claim 29, wherein the first set of operations includes two or more of the following types of operations: displaying of data, editing of data, storing of data, copying of data, transferring of data.

31. The article of manufacture of claim 28, wherein the program instructions are further executable to verify that the data includes copyright information.

32. The article of manufacture of claim 31, wherein the copyright information includes original copyright information and copyright information subsequently added to the data.

33. The article of manufacture of claim 28, wherein the received data cannot be used without the receipt of copyright information associated with the received data.

34. A computing device, comprising:

a processor;

memory storing program instructions executable by the computing device to:

receive encrypted data;

use a first utilization permit key associated with the received encrypted data to decrypt said received encrypted data;

wherein the first utilization permit key is usable to authorize the performing of at least one, but not all, of a predetermined plurality of operations on a version of the decrypted data, wherein the predetermined plurality of operations include two or more of the following types of operations: displaying, editing, storing, copying, transferring; and wherein the first utilization permit key is usable to authorize performing at least one, but not all, of the predetermined plurality of operations on a re-encrypted version of the decrypted data, including at least one of the predetermined plurality of operations that the first utilization permit key does not authorize performing with respect to the decrypted data.

35. The computing device of claim 34, wherein the plurality of operations are hierarchical.

36. The computing device of claim 35, wherein the first utilization permit key is usable to authorize the performing of displaying of decrypted data and editing of decrypted data but not transferring of decrypted data.

37. The computing device of claim 34, wherein the program instructions are further executable by the computing device to verify that the received data includes copyright information.

38. The computing device of claim 37, wherein the copyright information includes original copyright information and copyright information subsequently added to the received data.

39. The computing device of claim 34, wherein the received data cannot be used without the receipt of copyright information associated with the received data.

40. An apparatus, comprising:

an interface configured to receive encrypted data; and means for using a utilization permit key to authorize the performing of one or more, but not all, of a predetermined plurality of operations and to prevent the performing of the remaining plurality of operations on a decrypted version of the received encrypted data, and for using the utilization permit key to authorize the performing of at least one of the predetermined plurality of operations on a re-encrypted version of the decrypted version of the received encrypted data.

41. A method comprising:

a computer system receiving encrypted data and a utilization permit key for the data;

the computer system using a copyright management program to manage utilization of the received data, including:

the computer system using the copyright management program to decrypt the received encrypted data using the utilization permit key;

the computer system using the copyright management program to authorize performing a first set of one or more of a plurality of operations on the decrypted data and a second set of one or more of the plurality of operations on a re-encrypted version of the decrypted data, wherein the first and second set of operations are specified by the utilization permit key.

* * * * *